United States Patent [19]
Eavey et al.

[11] Patent Number: 5,679,033
[45] Date of Patent: Oct. 21, 1997

[54] CAPACITOR TERMINAL COVER ASSEMBLY

[75] Inventors: Russell E. Eavey, Indianapolis; Michael D. Ward, Lebanon, both of Ind.

[73] Assignee: Yosemite Investment, Inc., Indianapolis, Ind.

[21] Appl. No.: 531,446

[22] Filed: Sep. 21, 1995

[51] Int. Cl.[6] ................................................. H01R 4/38
[52] U.S. Cl. ................................................. 439/801; 411/155
[58] Field of Search ..................................... 439/166, 167, 439/169, 801, 521, 522; 411/155, 156, 368, 531, 533, 544; 174/DIG. 10, 11 BH, 13 SF, 14 BH, 12 BH, 152 R

[56] References Cited

U.S. PATENT DOCUMENTS

| 3,168,321 | 2/1965 | Glicksman | 411/531 |
| 5,037,333 | 8/1991 | Baubles | 439/801 |

*Primary Examiner*—Neil Abrams
*Assistant Examiner*—T. C. Patel
*Attorney, Agent, or Firm*—Niro, Scavone, Haller & Niro

[57] ABSTRACT

A terminal capacitor cover assembly having a screw portion and a jacket portion for complementarily fitting a terminal for a capacitor. This assembly provides an easy retrofit for capacitor terminals to equip them with a aesthetically acceptable and functionally superior alternative material. The assembly can be constructed of material equivalent to the operatively connected electrical lead, thus reducing the anodization and cross metallic oxidation of the capacitor terminal.

3 Claims, 1 Drawing Sheet

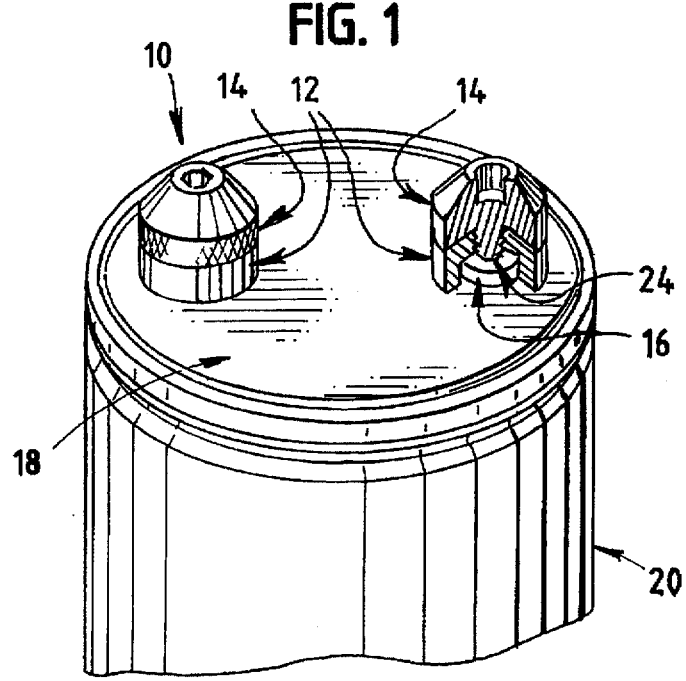
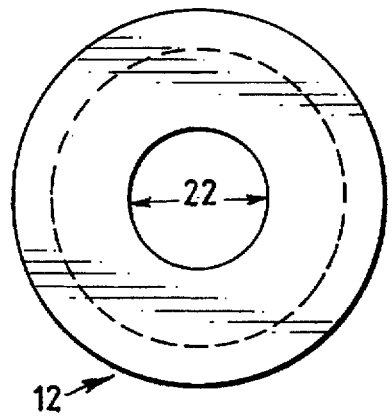
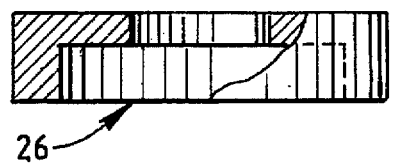
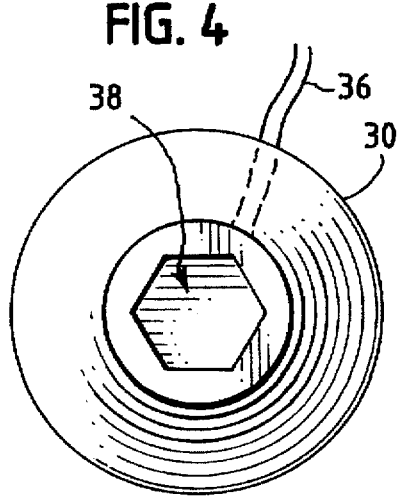
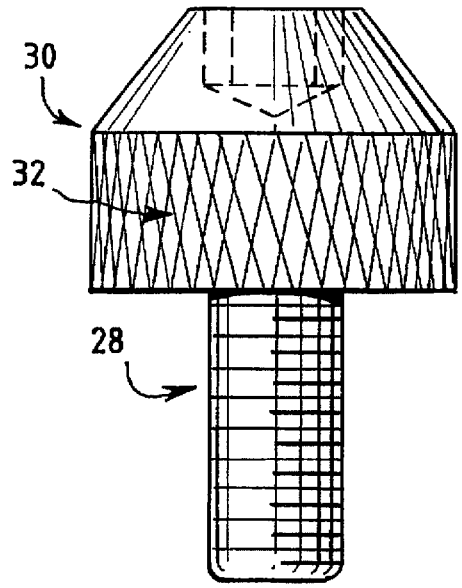

CAPACITOR TERMINAL COVER ASSEMBLY

BACKGROUND OF THE INVENTION

The present invention is directed toward an apparatus for covering a capacitor terminal and for providing a good contact with electrical leads. More specifically, the present invention is directed towards a jacket and screw assembly for retrofitting a gold-plated terminal cover on an electrolytic capacitor terminal that provides a better conducting contact, lessens cross metallic oxidation, and provides an acceptable appearance for the user.

The consumer car audio industry is very concerned with both the aesthetic appeal and performance of their products. The industry often uses gold-plated connections to enhance the appearance and insure the good performance of its products. One of the components often found in a car audio system is a capacitor, which is used to ensure a steady power supply to the stereo. Recently, the car audio industry began using high capacitance aluminum electrolytic capacitors to increase the performance of car audio installations. For a number of reasons, it is desired for the terminals of the capacitors to be gold-plated. To gold-plate the terminals of the capacitors requires the alteration of the normal production process of the capacitor, thus causing undesirable scheduling problems for the manufacturer. Alternatively, using a non-gold-plated terminal creates an unacceptable appearance, may adversely affect conductivity, and may result in cross metallic oxidation that disintegrates the electrical leads.

The present invention comprises a capacitor terminal cover assembly that can be retrofitted onto existing capacitor terminals. Thus, a gold-plated terminal can be provided for an high performance electrolytic capacitor without altering current capacitor manufacturing techniques.

OBJECTS AND FEATURES OF THE INVENTION

The present invention is concerned with providing a novel assembly for covering a capacitor terminal that creates an aesthetically pleasing appearance while avoiding any changes in the current manufacturing process for capacitors.

Another object of the present invention is to provide an aesthetically acceptable terminal cover assembly that ensures good conductivity in the connection of the capacitor to an electrical lead.

Yet another object of the present invention is to provide a capacitor terminal cover assembly that increases resistance of the terminal to anodization.

Still another object of the present invention is to provide a capacitor terminal cover assembly that reduces or eliminates cross metallic oxidation.

SUMMARY OF THE INVENTION

Accordingly, there is provided a capacitor terminal cover that comprises a screw and jacket assembly. The jacket engages in a snug complementary fit with the capacitor terminal, and has an aperture that exposes the internal thread in the terminal for receiving the screw. Specifically, the jacket comprises a hollowed disk having a narrow top aperture and a broader bottom aperture. The screw engages the top aperture in making a normal engagement with the internal thread of the terminal in the top assembly of the capacitor. The screw of the present assembly preferably has a diamond knurl around its periphery for a manual grip installation. Additionally, the screw preferably has a hexagonal recess in its top for accommodating an Allen wrench to ensure a tighter mechanical engagement.

DESCRIPTION OF THE DRAWINGS

FIG. 1 is a partially cut away perspective view of the assembly of the present invention engaged with the top of a capacitor.

FIGS. 2 and 3 are top and cut away side views respectively, of the jacket element of the present invention.

FIGS. 4 and 5 are top and side views, respectively, of the screw element showing the screw features of the present invention.

DETAILED DESCRIPTION OF THE PREFERRED EMBODIMENT

Referring to the drawings, FIG. 1 shows the assembly 10 of the present invention in operation. The assembly 10 comprises a jacket 12 and a screw 14. The jacket 12 is placed over a capacitor terminal 16 located on the top portion 18 of the capacitor 20. In the preferred embodiment of the present invention, the terminals 16 of the capacitor 20 are constructed of aluminum, thus making the retrofit of a gold-plated terminal assembly 10 desirable. The jacket 12 is preferably machined to provide a close fit with the terminal 16, but does not have to provide a snap or friction fit because of the normal operational engagement of the screw 14 with the terminal 16.

As shown in FIGS. 1 and 2, the jacket 12 has a top aperture 22 of equal or slightly larger diameter than the terminal aperture 24. The jacket further has a bottom aperture 26 having an internal diameter of slightly greater width than the diameter of the terminal. Thus, the jacket 14 is supported by the top portion 18 of capacitor 20, and substantially eliminates the environmental exposure and possible corrosion of terminal 16.

As shown in FIGS. 4 and 5, the screw 14 of the present assembly 10 comprises a threaded portion 28 and a cap portion 30. In a preferred embodiment, the cap portion contains a diamond knurl 32 extending around the circumference of the cap 30. The diamond knurl assures a sound frictional grip for manually installing and tightening the screw 14 in the jacket 12 and terminal 16 arrangement. The screw 14 frictionally engages the terminal 16 by means of the internal thread (not shown) which receives the threaded portion 28 until the bottom of the cap 30 is pressed against the top of the jacket 12. In operation, the electrical lead 36 is trapped in this fit between the bottom surface of the cap 30 and the top surface of the jacket 12.

Another preferred embodiment of the present invention includes a recess 38 embedded in the top of the cap 30. Preferably, this recess 38 has a hexagonal or similarly situated cross section (as can be seen in FIG. 5) for mechanically engaging an Allen wrench or similar tool. In a most preferred embodiment, the screw 14 contains includes both the diamond knurl 32 and recess 38, thus permitting a quick manual installation and a tighter mechanical fit.

Since the car audio industry typically manufactures electrical leads and similar components from gold or gold-plate, it is preferred to make the jacket 12 and screw 14 of the present invention from a brass/gold-plate material, using a normal machining process. By using materials that are more compatible with the electrical lead 36 (not shown), the present invention will reduce the anodization of the currently used aluminum terminal 16. Also, by having a gold-plate to gold-plate connection, the present invention eliminates the possibility of cross metallic oxidation which could otherwise corrode and disintegrate the lead 36, thus creating an open connection. Alternatively, if the operatively connected electrical lead 36 is constructed of different material, the screw 14 and jacket 12 of the present invention should be constructed of similar material in order to ensure the performance advantages of the assembly 10.

Of course, it should be noted that various changes and modifications to the preferred embodiments of this invention will be apparent to those skilled in the art; such changes and modifications can be made without departing from the spirit and scope of the present invention. It is, therefore, intended that such changes and modifications be covered by the following claims.

What is claimed:

1. A capacitor terminal cover assembly, said assembly capable of being retrofitted to an existing capacitor terminal and providing a desired aesthetic appearance and a superior performance in connecting the capacitor to an electrical lead, said assembly comprising:

a jacket having a top aperture and a bottom aperture, said bottom aperture having a slightly larger interior diameter than the diameter of said capacitor terminal;

a screw for operatively engaging to said top aperture and frictionally engaging said capacitor terminal;

said screw comprising a threaded portion and a cap portion, said threaded portion having a diameter less than the interior diameter of said top aperture of said jacket, and said cap portion having friction means for providing a manual grip for installing and tightening said screw in said capacitor terminal.

2. The capacitor terminal cover assembly of claim 1 wherein said screw comprises a threaded portion and a cap portion, said cap portion having a recess for complementarily engaging a mechanical tool for installing and tightening said screw in said capacitor terminal.

3. The capacitor terminal cover assembly of claim 1 wherein said electrical lead, said screw and said jacket are all constructed of substantially the same material.

* * * * *